United States Patent
Ho

(10) Patent No.: US 11,970,140 B2
(45) Date of Patent: Apr. 30, 2024

(54) CAR TISSUE BOX HOLDER

(71) Applicant: Founder Plastics Inc., Stouffville (CA)

(72) Inventor: Joseph Ho, Stouffville (CA)

(73) Assignee: Founder Plastics Inc., Stouffeville (CA)

( * ) Notice: Subject to any disclaimer, the term of this patent is extended or adjusted under 35 U.S.C. 154(b) by 0 days.

(21) Appl. No.: 17/745,452

(22) Filed: May 16, 2022

(65) Prior Publication Data

US 2022/0363200 A1    Nov. 17, 2022

Related U.S. Application Data

(60) Provisional application No. 63/189,528, filed on May 17, 2021.

(51) Int. Cl.
*B60R 7/08*    (2006.01)
*B60R 7/05*    (2006.01)

(52) U.S. Cl.
CPC ............... *B60R 7/084* (2013.01); *B60R 7/05* (2013.01)

(58) Field of Classification Search
CPC ...... A47K 10/025; A47K 10/00; A47K 10/16; B60R 7/084; B60R 7/05; Y10S 248/905
USPC ....... 248/905, 311.3, 205.2, 206.5, 683, 690, 248/505
See application file for complete search history.

(56) References Cited

U.S. PATENT DOCUMENTS

| | | | | |
|---|---|---|---|---|
| 2,287,581 | A * | 6/1942 | Walker | A47K 10/185 248/905 |
| 2,887,216 | A * | 5/1959 | Hargraves | B60R 7/084 248/905 |
| 2,908,434 | A * | 10/1959 | Schnabel | B60R 7/084 224/555 |
| 2,988,410 | A * | 6/1961 | Weisz | B60N 3/12 211/1 |
| 5,040,841 | A * | 8/1991 | Yang | B60J 3/0208 296/97.7 |
| 5,329,947 | A * | 7/1994 | Shikler | A45C 11/008 132/304 |
| 5,332,138 | A * | 7/1994 | Gross | B60R 7/084 224/543 |
| 5,345,633 | A * | 9/1994 | Harnish | B60N 2/879 5/639 |
| 5,503,316 | A * | 4/1996 | Stewart | B60R 7/05 224/901.4 |
| 5,762,246 | A * | 6/1998 | Drew | B60R 7/05 224/572 |
| 6,474,610 | B1 * | 11/2002 | Hsieh | B60R 7/084 248/905 |
| 7,584,865 | B2 * | 9/2009 | Hsing-Hsien | B60R 7/084 220/483 |

(Continued)

*Primary Examiner* — Christopher Garft
*Assistant Examiner* — Michael McDuffie
(74) *Attorney, Agent, or Firm* — Fitch, Even, Tabin & Flannery, LLP

(57) ABSTRACT

A car tissue box holder is provided. The tissue box is secured to the sun visor of the vehicle by hook and loop or Velcro straps. A pair of straps securing a metal plate to the tissue box attaches to a magnet holder plate secured to the sun visor. The magnet holder plate has a magnetic component help by a plastic component of the magnet holder plate. The Velcro straps are thread through the respective plates. The plates allow adjustment to different sized of tissue box and sizes of sun visors and easy or removal of the tissue box.

14 Claims, 4 Drawing Sheets

(56) References Cited

U.S. PATENT DOCUMENTS

| | | | | |
|---|---|---|---|---|
| 7,870,983 | B2* | 1/2011 | Chen | B60R 11/00 |
| | | | | 224/572 |
| 8,561,865 | B2* | 10/2013 | Mantis | B60R 7/05 |
| | | | | 224/312 |
| 8,876,185 | B1* | 11/2014 | Edwards, Sr. | B60J 3/0208 |
| | | | | 296/97.8 |
| 10,167,884 | B2* | 1/2019 | Bulat | F16B 2/08 |
| 10,183,628 | B2* | 1/2019 | Mea | A45F 5/00 |
| 11,027,598 | B2* | 6/2021 | Pathak | B60J 3/0208 |
| 11,529,010 | B1* | 12/2022 | Avery | B29C 65/50 |
| 2010/0064544 | A1* | 3/2010 | Luong | A47L 23/205 |
| | | | | 34/239 |
| 2012/0043789 | A1* | 2/2012 | Lee | B60R 7/084 |
| | | | | 297/188.06 |
| 2017/0349327 | A1* | 12/2017 | Cwojdzinski | F16B 2/08 |
| 2019/0111852 | A1* | 4/2019 | Thompson | B60R 7/082 |
| 2019/0298047 | A1* | 10/2019 | Vanettes | A45F 5/00 |

* cited by examiner

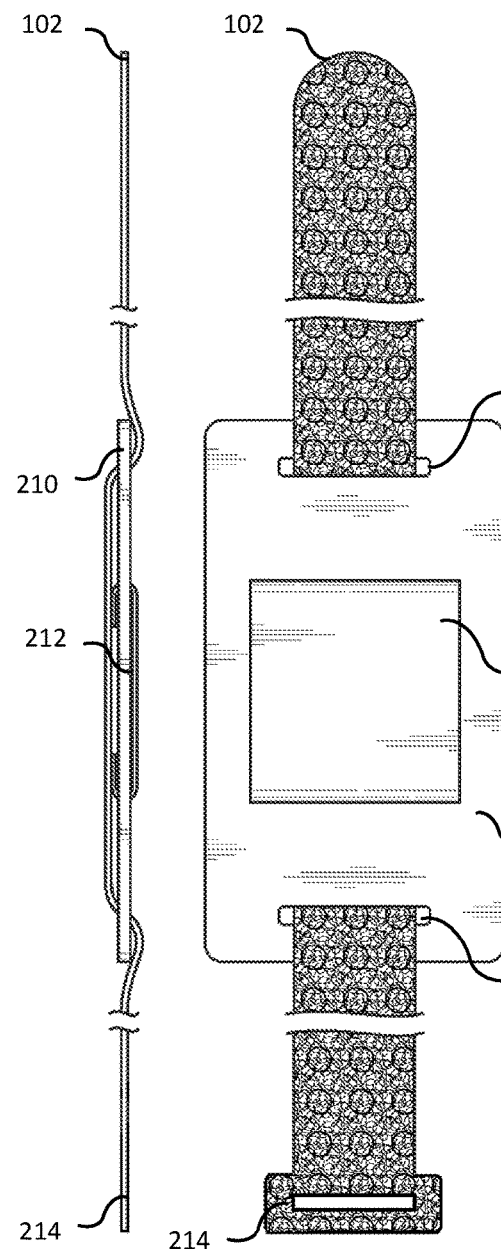
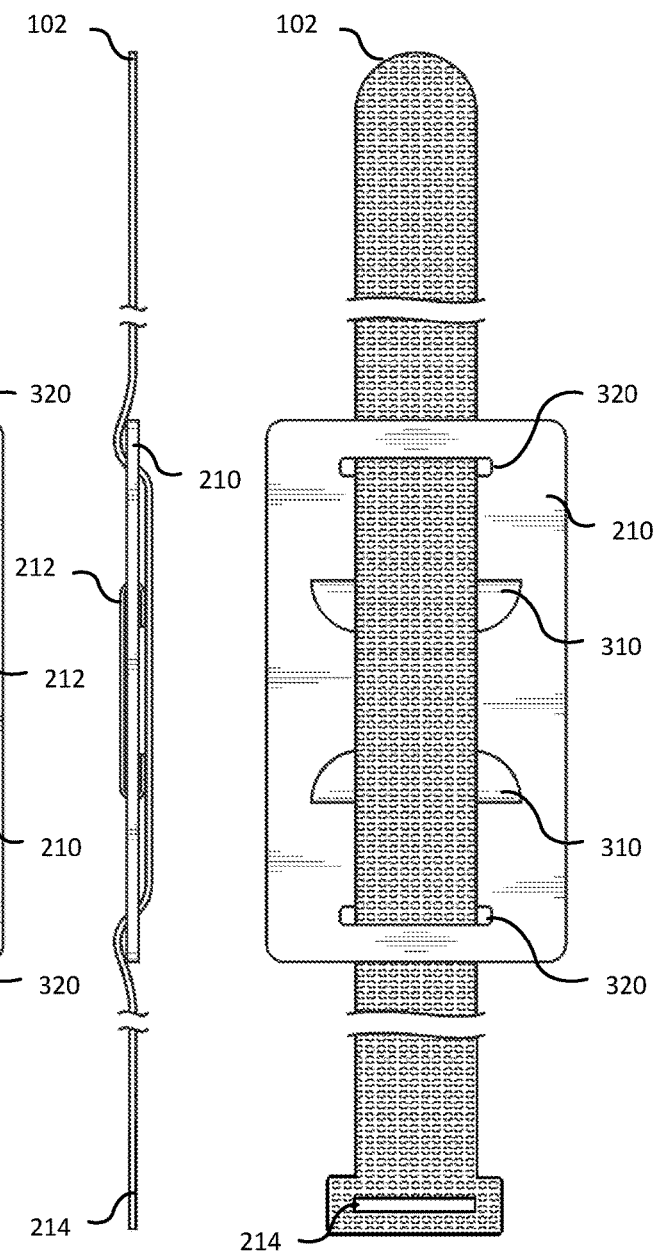
FIG. 3A  FIG. 3B  FIG. 3C  FIG. 3D

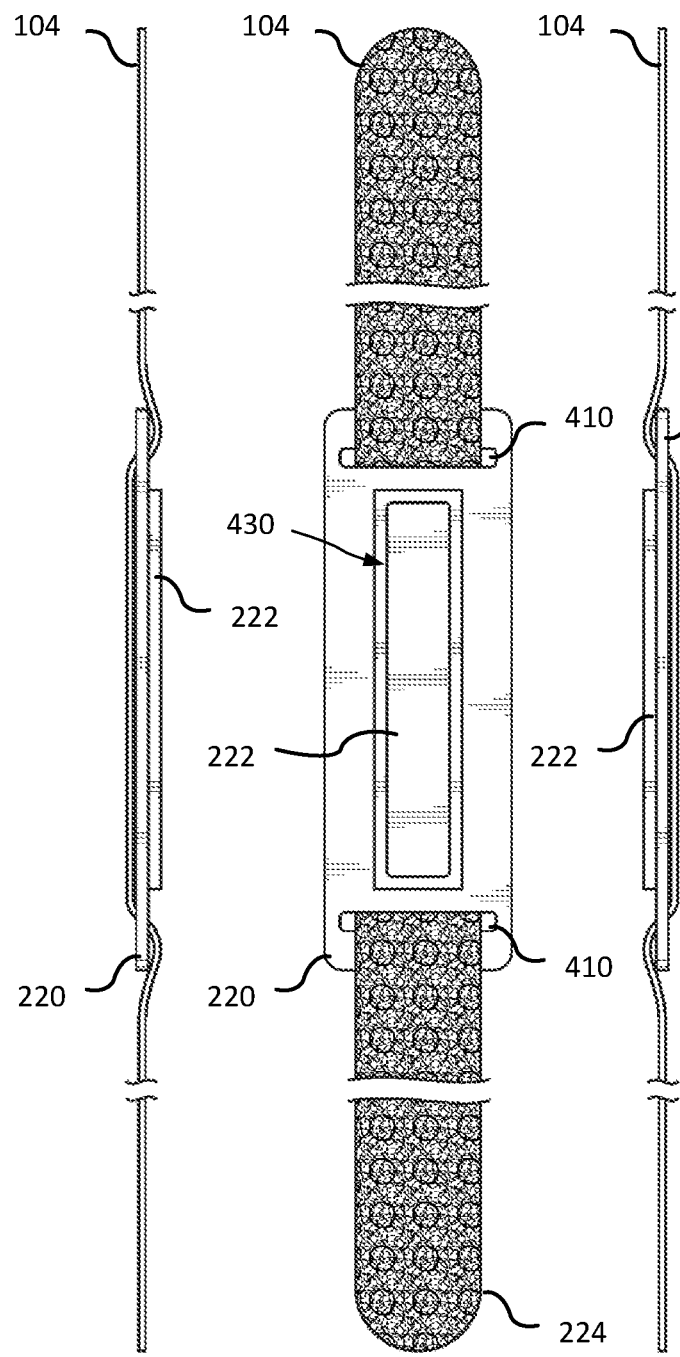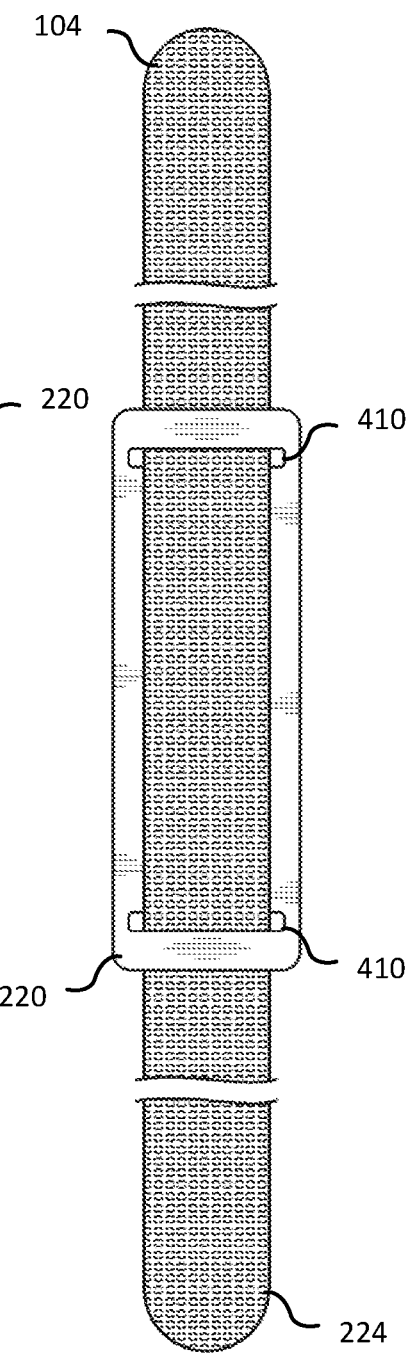
FIG. 4A  FIG. 4B  FIG. 4C  FIG. 4D

CAR TISSUE BOX HOLDER

CROSS-REFERENCE TO RELATED APPLICATIONS

This application claims benefit of U.S. Provisional Application No. 63/189,528, filed May 17, 2021, which is hereby incorporated herein by reference in its entirety.

TECHNICAL FIELD

The present disclosure relates to tissue boxes and in particular to holding or securing a tissue box within a car.

BACKGROUND

Items placed within a car interior can present challenges in accessibility and movement within the car. Facial tissues are commonly present within a car which does not have a dedicated location to store and provide easy access to the occupants. Existing solutions utilize a holder which clips to a sun visor to contain the tissue box. The holder generally encompass the tissue box which limits the size of the boxes and do not provide for ease of removal of the tissue box from the sun visor as the holder must be clipped onto the visor.

Accordingly, an improved car tissue box holder remains highly desirable.

BRIEF DESCRIPTION OF THE DRAWINGS

Further features and advantages of the present disclosure will become apparent from the following detailed description, taken in combination with the appended drawings, in which:

FIGS. 3A-3D show views of a tissue box strap; and

FIGS. 4A-4D show views of a car sun visor strap.

It will be noted that throughout the appended drawings, like features are identified by like reference numerals.

DETAILED DESCRIPTION

Embodiments are described below, by way of example only, with reference to FIGS. 1-4.

Figure 1:
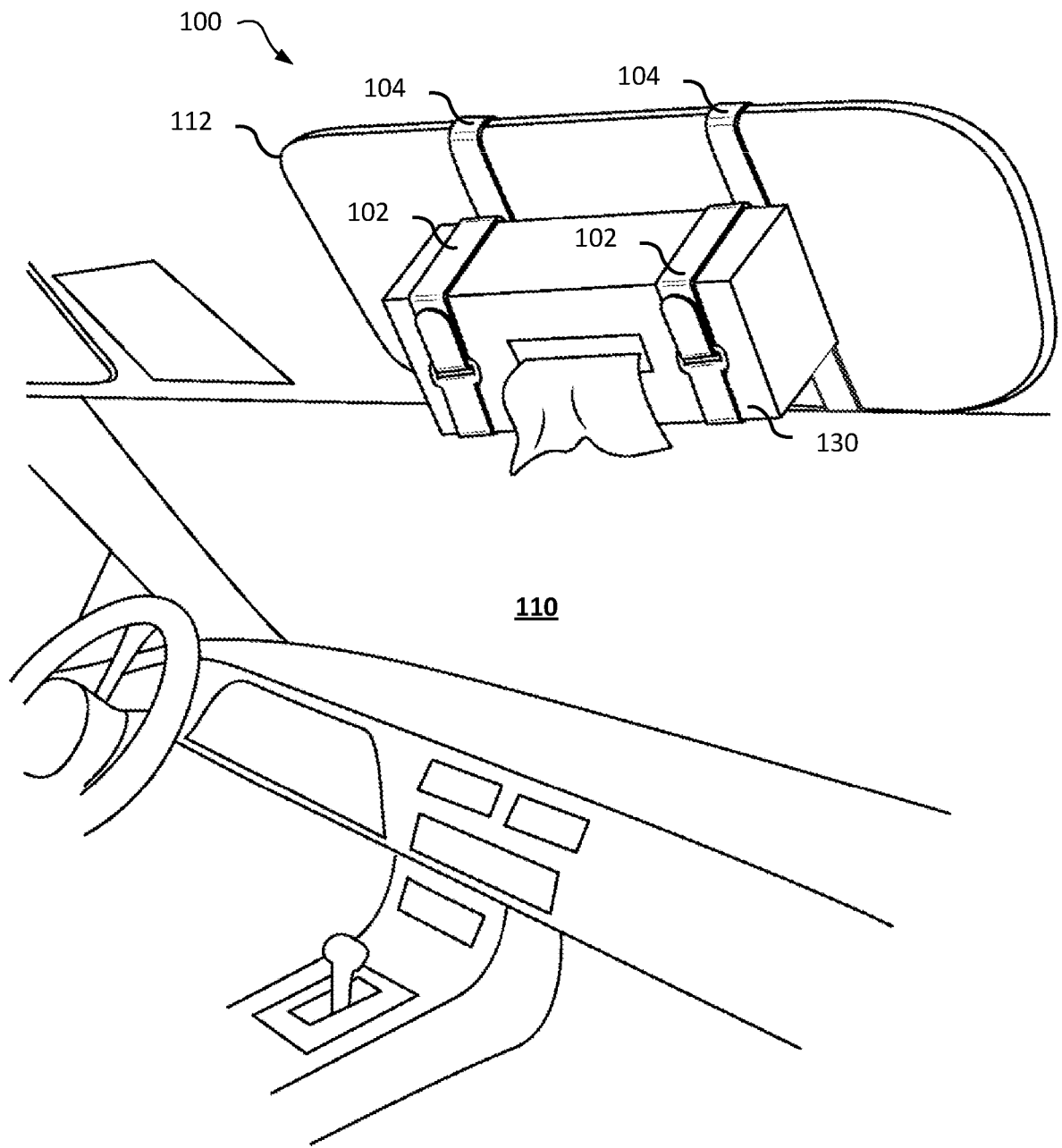
FIG. 1 shows a representation of car tissue box holder installed on a sun visor.

FIG. 1 shows a representation of tissue box holder 100 installed on a sun visor 112 in the interior of a car 110. The tissue box holder 100 comprises a pair of tissue box straps 102 wrapped around a tissue box 130. The tissue box straps 102 magnetically secure to car sun visor 112 by straps 104. The car sun visor straps 104 are secured around the sun visor 112 of the car and can be adjusted to accommodate different sizes of sun visors. At least a portion of the straps 102/104 are made of a Velcro™ or hook and loop material to provide a secure attachment and be easily adjusted or removed as required. Each strap may contain a portion of Velcro material or be made completely of a Velcro material. The adjustable straps allow for different sizes of tissue boxes 130 to be accommodated and secured to varying sizes of car sun visors. The magnetic mounting provides sufficient attachment force to maintain contact while individual tissues are removed but also allow removal of the tissue box when sufficient force is applied.

Figure 2:
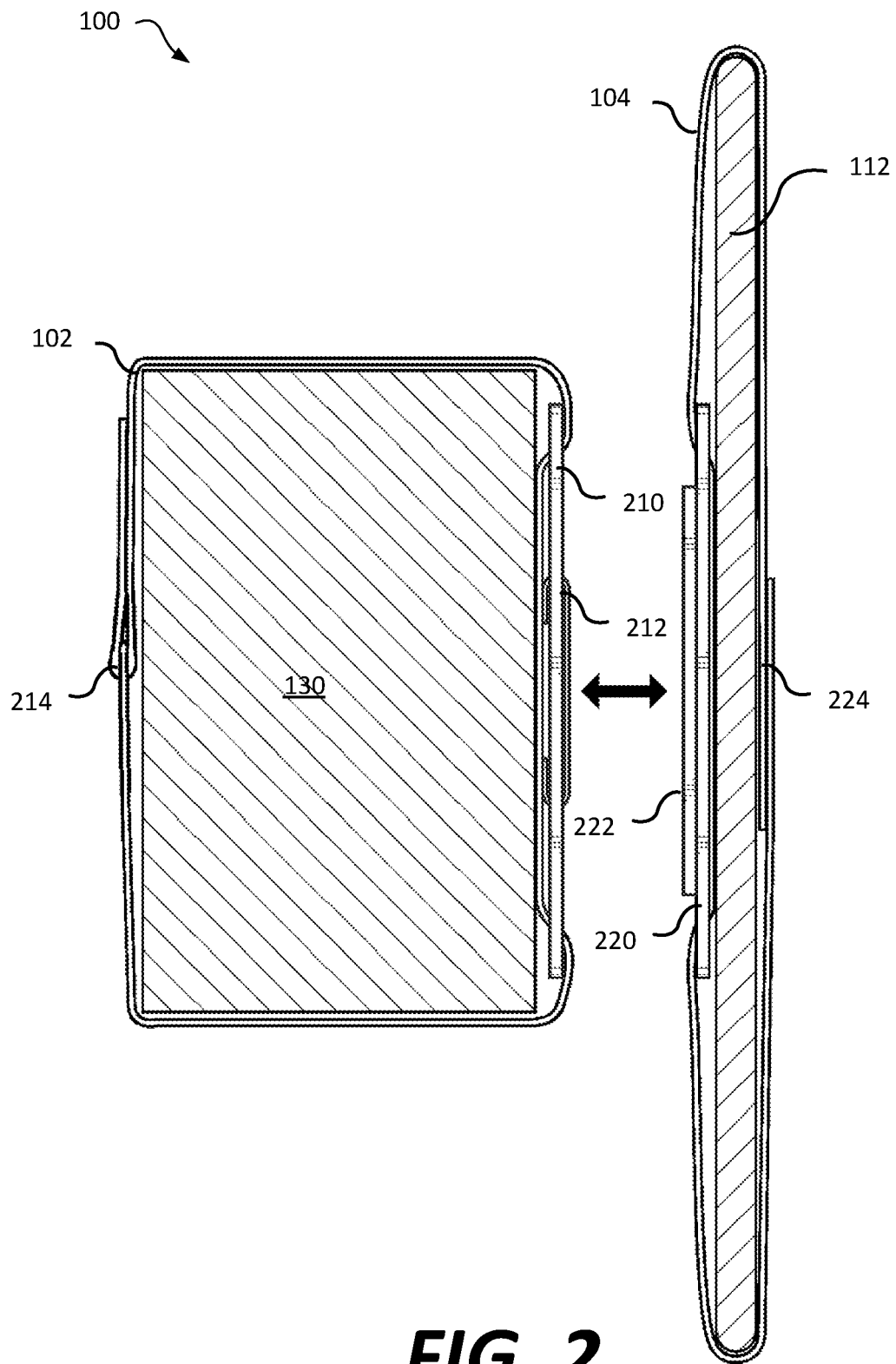
FIG. 2 shows a side view of the car tissue box holder installed in a sun visor.

FIG. 2 shows a side view of the car tissue box holder 100 installed on a sun visor 112 and a tissue box 130. The tissue box strap 102 contains a tissue box retaining plate 210, the strap 102 loops through openings in the tissue box retaining plate 210. The retaining plate 210 is manufactured with a plastic material to which a metal plate 212 is affixed thereto. The metal plate 212 can contain tabs or wings which are bent through additional openings made within the retaining plate. Alternatively the metal plate may be adhered to the retaining plate 210 or the retaining plate 210 may be made of a metal material. The strap 102 is secured through an opening 214 of the strap 102. The strap 102 may be for example 18 inches in length providing adjustability to accommodate different tissue box sizes. The car sun visor strap 104 wraps around the sun visor 112 having a magnet holder plate 220 which the strap threaded there through. The magnet holder plate 220 is made of a plastic material having a magnet 222, or magnets, are retained within or affixed thereto. The metal plate 212 is attracted by the magnets 222 securing the tissue box 130 to the sun visor 112. The magnets 222 are permanent magnets made of rare earth magnetic material.

FIGS. 3A-3D show views of a tissue box strap 102. FIGS. 3A and 3C show side views of the tissue box strap 102 and retainer plate 210. FIGS. 3B and 3D show a front face and a back face of the tissue box strap 102 and retaining plate 210 respectively. The retaining plate 210 has openings 320 for threading the strap there through with a metal component 212 such as a metal plate contained thereon. The retaining plate 210 provides a generally rectangular shape, the length of which will fit within a width of a tissue box. The metal component 212 is retained by wings 310 to the back portion of the retaining plate 210 which are bent through openings of the retaining plate 210 to secure it thereto. The strap 102 has an opening 214 to receive the opposite end of the strap 102 for the strap to be secured there through. The opening 214 may be part of the strap 102 or provided by a buckle or snap. The tissue box straps 102 are installed by wrapping around the tissue box 130 with the metal plate 212 positioned on the bottom of the box. The two tissue box straps 102 are installed parallel to each other approximately 4.5 inches apart and the strap is secured on the top of the tissue box 130 by threading the strap 102 through opening 214.

FIGS. 4A-4D show views of a car sun visor strap 104 and magnet holder plate 220. FIGS. 4A and 4C show side views of the visor strap 104 and magnet holder plate 220. FIGS. 4B and 4D show a front face and a back face of the visor strap 104 and magnet holder plate 220 respectively. The magnet holder plate 220 is made of a plastic material containing a magnetic component 222 that is retained or affixed to the magnet holder plate 220. The magnet holder plate 220 can be molded out of plastic to have an opening 430 for receiving the magnetic component 222 through opening on a back side of the magnet holder plate 220. The opening 430 may be smaller than the magnetic component to retain it within the magnet holder plate 220. Alternatively the plate 220 may contain an indentation on one side to receive the magnets without an opening on the opposite side wherein the magnetic components 222 are not directly exposed through the magnet holder plate 220. The magnet may alternatively be secured by a metal plate wrapped around the magnet as should in FIG. 3 or by a stepped magnet that can be secured within the magnet holder plate 220 to retain the magnet component 222 within the magnet holder plate 220. Alternatively a plastic plate may be clipped to the magnet holder plate 220 to retain the magnetic component 222.

The magnet holder plate 220 has openings 410 for threading the strap there through. Each car sun visor strap 104 can be approximately 24 inches in length and can be cut to a suitable length to accommodate the width of the sun visor 112. The car sun visor straps 104 are secured to the sun visor 112 with the magnet holder plate 220 facing the interior of the car cabin. The two straps are spaced apart approximately 4.5 inches to receive the retaining plate 210. The tissue box 130 can then be attached to the visor 112 by the magnet forces or magnetic attraction between the retaining plate 210 and the magnet holder plate 212 providing easy attachment and removal as required.

It would be appreciated by one of ordinary skill in the art that the system and components shown in FIGS. 1-4 may include components not shown in the drawings. For simplicity and clarity of the illustration, elements in the figures are not necessarily to scale, are only schematic and are non-limiting of the elements structures. It will be apparent to persons skilled in the art that a number of variations and modifications can be made without departing from the scope of the invention as defined in the claims.

The invention claimed is:

1. A car tissue box holder comprising:
    a pair of tissue box retaining straps, each retaining strap having a retaining plate thereon, the pair of tissue box retaining straps for placement along a length of a tissue box and adjustable to retain the tissue box within the pair of tissue box retaining straps and accommodating varying sizes of tissue boxes; and
    a pair of visor straps, for securing to a visor of a car, each visor strap securing a magnet holder plate containing a magnetic component, wherein the pair of visor straps encircle the visor for retaining thereon;
    wherein the tissue box is magnetically secured to the visor by magnetic attraction of the retaining plate to the magnet holder plate and the magnetic component is a rare earth magnet;
    wherein the metal plate is secured by a pair of wings which are folded on a back portion of the retaining plate through openings of the metal plate.

2. The car tissue box holder of claim 1 wherein at least a portion of the pair of tissue box retaining straps and pair of visor straps comprise a hook and loop material.

3. The car tissue box holder of claim 1 wherein each retaining plate is made of a plastic material having a metal component.

4. The car tissue box holder of claim 1 wherein each magnet holder plate is made of plastic having a magnetic component.

5. The car tissue box holder of claim 1 wherein the magnetic component is a stepped magnet.

6. The car tissue box holder of claim 1 wherein the magnetic component is secured within the magnet holder by a metal plate.

7. The car tissue box holder of claim 1 wherein the magnetic component is secured within the magnet holder by a sticker.

8. The car tissue box holder of claim 1 wherein the magnetic component is secured within the magnet holder by a plastic plate.

9. The car tissue box holder of claim 1 wherein the retaining plate of the pair of tissue box retaining straps has a metal plate affixed thereon.

10. The car tissue box holder of claim 1 wherein the pair of tissue box retaining straps has an opening for receiving an opposite end of the tissue box retaining strap.

11. The car tissue box holder of claim 1 each magnetic component is adhered to each respective magnet holder plate of the pair of visor straps.

12. The car tissue box holder of claim 1 wherein the magnetic component fits within a slot of the magnet holder plate of the visor strap.

13. The car tissue box holder of claim 1 wherein each retaining plate and magnet holder plate are generally rectangular.

14. The car tissue box holder of claim 1 wherein each retaining plate and magnet holder plate each have a pair of openings for threading a respective strap therethrough.

* * * * *